April 23, 1968   C. W. MARSHALL ETAL   3,379,463
BEARING MECHANISM FOR LOAD SUPPORTING MULTIPLE PLY CABLES
Filed Oct. 22, 1965   3 Sheets-Sheet 1
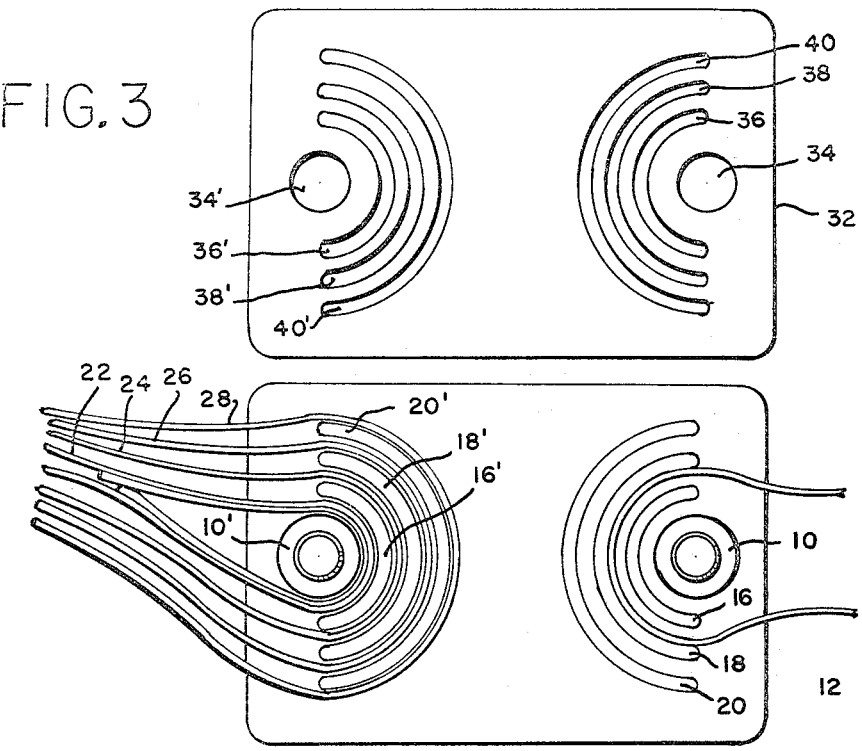
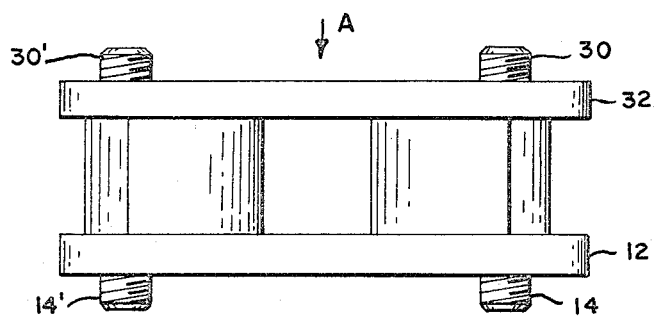
INVENTORS
CLIFTON W. MARSHALL,
HENRY J. HUNTER
BY
ATTORNEYS INVENTORS
CLIFTON W. MARSHALL,
HENRY J. HUNTER
BY Harry A. Herbert Jr
Ruth Cadier
ATTORNEYS United States Patent Office 3,379,463
Patented Apr. 23, 1968

3,379,463
BEARING MECHANISM FOR LOAD SUPPORTING MULTIPLE PLY CABLES
Clifton W. Marshall, 526 Driftwood Drive, and Henry J. Hunter, 1592 Desert Gardens Drive, both of El Centro, Calif. 92244
Filed Oct. 22, 1965, Ser. No. 502,744
5 Claims. (Cl. 287—63)

ABSTRACT OF THE DISCLOSURE

The elements of a multiple ply end loop of a load carrying cable are separated and separately supported by a single rigid bracket element comprising a pin and arcuate elements rigidly mounted on a plate and concentrically located with respect to the pin and to each other for dividing the load carried by the pin.

The invention described herein may be manufactured and used by or for the United States Government for governmental purposes without payment to us of any royalty thereon.

This invention relates to bearing mechanisms for load supporting, multiple-ply cables or straps, and more particularly to the design of attachments used in high force range of the order of 35,000 lbs. and above. Forces of this order are encountered in the elements used to attach parachute suspension lines to pay loads in air retrieval devices.

Multiple-ply webbing is commonly used in devices of this kind, and strength has been gained by increasing the number of plies of webbing. A single pin supports the entire weight and withstands the total stress or fails under it. There is great compression force borne by the plies closest to the pin from the outer plies as the force is increased. Furthermore, there is friction and heat generated as the plies slide and grind along each other. In the multiple-ply concentric riser, be it four or eight or any selected number, the inner loop takes the brunt of the compression forces from all the other loops, while sustaining its own share of the tensile force. Failures occur under conditions of this sort, the plies breaking in outward succession.

The object of the present invention is to provide a bearing device for laminated cables or flat straps wherein the number of laminations, plies, webbing loops or flat straps, as the case may be, may be increased for additional strength without increasing friction and wherein the tensile force is distributed evenly to the individual ply elements. This purpose is accomplished by providing separation and individual support for the elements which make up the multiple-ply cable loops, so that friction of the loops rubbing against each other is eliminated and the load is borne, not by a central pin alone, but is distributed. These separation elements may be in the form of arcuate or circular segments of steel straps secured to a plate, and radiating concentrically from a centrally located pin secured also to the plate. Their number is governed by the number of plies in the cable.

Where risers of a pay-load are attached to suspension lines of a parachute, an attaching plate may be provided with a pair of oppositely facing systems, each system as described above and positioned so that the weight imposed on each loop is carried on the outer circumference of the supporting and separating element, supporting the individual loop.

Figure 4:
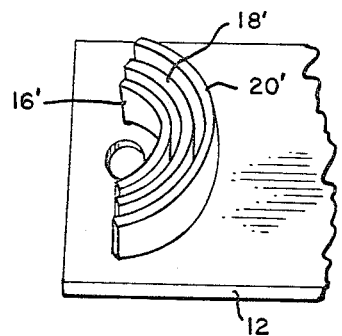
Figure 5:
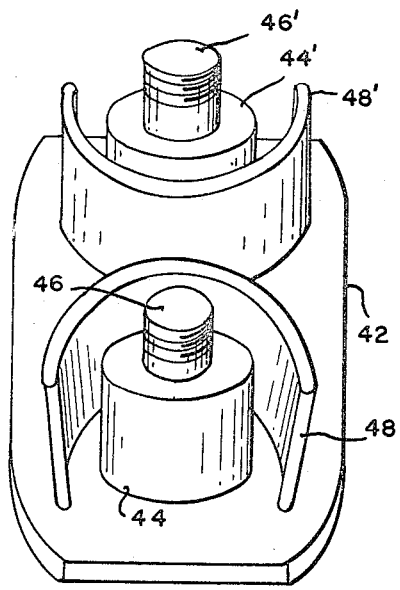
Figure 6:
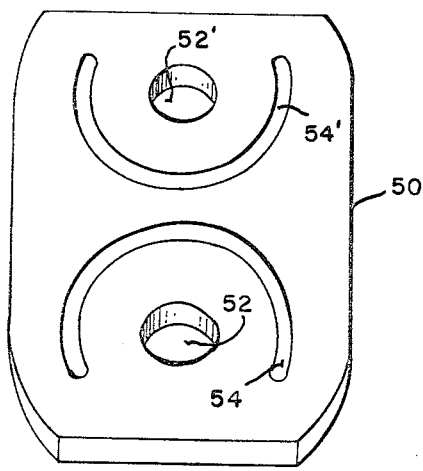
Figure 7:
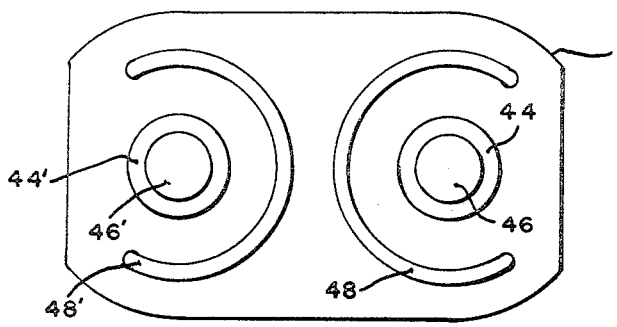
Figure 8:
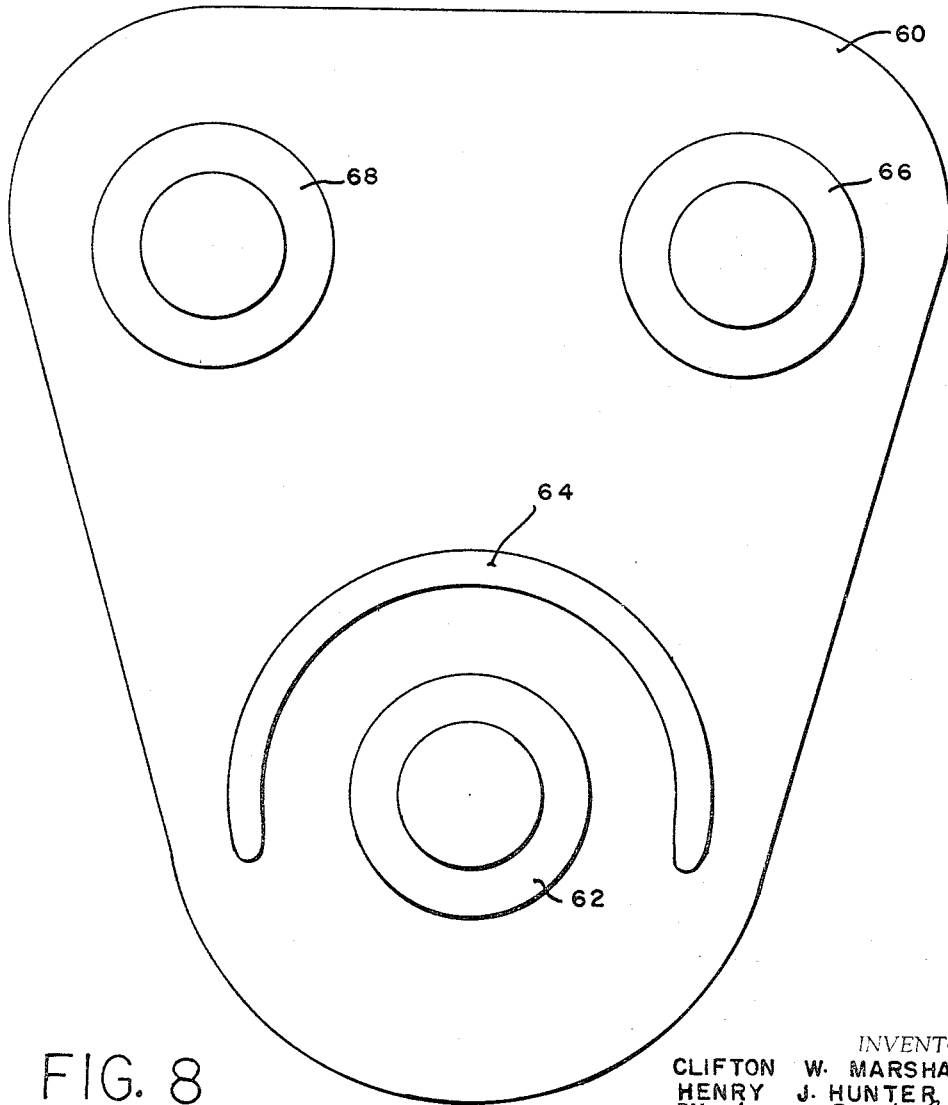

These and other advantages, features and objects of the invention will become more apparent from the following description taken in connection with the illustrative embodiments in the accompanying drawings, wherein:

FIG. 1 is a side elevational view of the device;
FIG. 2 is a side view of the device with the removable supporting plate removed, looking in the direction of arrow A of FIG. 1;
FIG 3 is a view of the removable supporting plate;
FIG. 4 is a perspective view of one set of separating elements, with the central pin removed;
FIG. 5 is a perspective view of a modified form of the device, without its movable plate, adapted for separation of the laminated elements of two or four-ply cables;
FIG. 6 is a perspective view of the removable plate utilized with FIG. 5;
FIG. 7 is a side view of the device of FIG. 5 with the removable plate removed; and
FIG. 8 is a top plan view of a modified form of the device.

The described orientation of FIGS. 1 through 7 is that assumed by the device in its application to parachute suspension lines and airborne pay loads. Each of the devices may be applied in situations where the stress is not applied vertically but may be applied horizontally, and in situations where stress is divided angularly as in FIG. 8.

Referring more in detail to FIGS. 1, 2 and 3 of the drawing, a pair of central bearing elements or pins 10 and 10' are each secured to a plate 12. This may be done by application of bolts to reduced screw threaded ends 14 and 14', or in any other rigid manner. Two sets of bearing elements in the form of arcuate straps 16, 18, 20 and 16', 18' and 20' are also rigidly secured to the plate 12.

The two sets of arcuate bearing elements 16, 18, 20 and 16', 18' and 20' are concentrically arranged about the pins 10 and 10', respectively, and increase in diameter outwardly from the centrally located pin, and are spaced to receive elements of laminated multi-ply cable loops.

FIG. 2 shows four such loops: 22, 24, 26, 28, 22', 24', 26', and 28', the central pins or bearing elements 10 and 10' receiving the inner loops 22 and 22', respectively. The sets of arcuate elements are positioned in FIG. 2 to receive cable loops whose stress is applied in opposite directions. The stress may be in vertical, up and down direction as in parachute and load connections, or horizontally. It is conceivable within the scope of the invention, that the device be arranged to accommodate angular stresses as well.

The connection of the two looped cables is achieved manually and is manually severable. The pins 10 and 10' are each provided with reduced threaded ends 14, 14', as noted above, and reduced threaded opposite ends 30 and 30'. A plate 32 is provided with a pair of openings 34 and 34' for receiving the elements 30 and 30' and opposed sets of arcuately formed grooves 36, 38, 40, 36', 38' and 40' for receiving the exposed edges of the bearing straps 16, 18, 20, 16', 18' and 20'.

As is now apparent, the connection is made or severed, and the cable loops installed or removed by removal of the upper plate 32.

The modification shown in FIGS. 5, 6 and 7 is similar in all respects to the device described above except that it provides one bearing separator only for connection of two ply cable loops.

A base plate 42 has attached thereto a pair of central bearing elements 44 and 44', having reduced and threaded ends 46 and 46' and a single pair of opposed arcuate elements 48 and 48', concentric with the pins or bearing elements 44 and 44'. The removable plate 50 is provided with openings 52, 52' and single grooves 54, 54'.

FIG. 8 is a further modification and illustrates the variety of situations which the invention serves.

A plate 60 carries a central bearing element 62 and a concentrically oriented arcuate bearing element 64. Two opposed bearing elements 66 and 68 provide connected for two cables (not shown) which may or may not be laminated, as the situation requires. This form may be used, for example, for a pay load suspended on the bearing element 62 and supported by a pair of parachutes. Stress and supporting power is divided between the two elements 66 and 68 and is exemplary of the many applications wherein division of stress is useful. It is conceivable that the invention could serve also in the suspension of clustered parachutes.

Although the invention has been described with reference to particular embodiments, it will be understood to those skilled in the art that the invention is capable of a variety of alternative embodiments within the spirit and scope of the appended claims.

We claim:

1. A bearing device for load supporting cables comprised of laminated multiple-ply loops, said bearing device comprising a plate, a central bearing pin rigidly secured to said plate and normal thereto, a plurality of stationary spaced arcuate bearing and separating elements mounted on said plate and concentrically positioned with reference to said pin and to each other and forming widening arcs about said pin, said pin adapted to support the inner loop of said multiple-ply cable loops, said bearing elements positioned to support on the outward circumferential surface of each, a loop of said multiple-ply cable.

2. A load bearing cable support for supporting laminated end loops of load bearing laminated cable for distributing stress and minimizing friction, said device comprising a plate, a pin rigidly mounted on said plate and normal thereto and adapted to support the innermost loop of said laminated cable, a plurality of spaced supporting and bearing elements, rigidly mounted on said plate, said elements being arcuately formed and radially positioned with reference to said pin and to each other in the semicircle opposite to the direction of stress, said spaced supporting and bearing elements each adapted to receive a loop of said laminated cable.

3. A connecting device for effecting connection between load bearing cable elements, multiple ply in character, said device comprising, a pair of plates, a pair of pins secured to said plates and holding said plates in parallel relationship, a set comprising a plurality of arcuately formed bearing and spacing elements arranged about each pin, each of said sets comprised of a plurality of strap elements rigidly secured to at least one of said plates arcuately formed and radially located with reference to one of said pins, each set being located to support the inner loop and the individual ply elements of one of said multi-ply cables.

4. A device as claimed in claim 3, wherein each set of arcuately formed elements is located to receive and support loads whose stress is applied in opposite directions.

5. A load supporting device comprising a plate, central bearing pin rigidly secured to said plate and normal thereto, a plurality of spaced, arcuate bearing and separating elements, rigidly mounted on said plate, and concentrically positioned with reference to said pin, a cable end loop comprised of flat laminated multiple-ply loop elements, each element being separable and adapted to be received by one of said bearing and separating elements and in load bearing relationship thereto.

References Cited

UNITED STATES PATENTS

| 1,797,406 | 3/1931 | Erlewine | 308—18 |
| 2,548,534 | 4/1951 | Hutchison | 287—52 |
| 2,841,020 | 7/1958 | Vandeventer | 308—18 |
| 3,117,780 | 1/1964 | Dionne | 248—60 |

FOREIGN PATENTS 899,103 12/1953 Germany.

CARL W. TOMLIN, *Primary Examiner.*

EDWARD C. ALLEN, *Examiner.*

ROBERT SKUDY, *Assistant Examiner.*